(12) United States Patent
McDonald

(10) Patent No.: US 6,666,370 B2
(45) Date of Patent: Dec. 23, 2003

(54) SOLDER-DROSS MIXTURE SEPARATION METHOD AND APPARATUS

(75) Inventor: David M. McDonald, Cadmenton, MO (US)

(73) Assignee: Speedline Technologies, Inc., Franklin, MA (US)

(*) Notice: Subject to any disclaimer, the term of this patent is extended or adjusted under 35 U.S.C. 154(b) by 6 days.

(21) Appl. No.: 10/051,407

(22) Filed: Jan. 18, 2002

(65) Prior Publication Data

US 2003/0136816 A1 Jul. 24, 2003

(51) Int. Cl.⁷ .............................................. B23K 31/02
(52) U.S. Cl. .......................................... 228/203; 228/34
(58) Field of Search ............................ 228/33, 34, 36, 228/37, 38, 203; 266/227

(56) References Cited

U.S. PATENT DOCUMENTS

| 404,381 A | 6/1889 | Clark |
| 814,334 A | 3/1906 | Taliaferro |
| 4,057,232 A | 11/1977 | Ross et al. .................. 266/227 |
| 4,075,008 A | 2/1978 | Leonard ......................... 75/86 |
| 4,191,559 A | 3/1980 | Van Linden et al. ........ 75/68 R |
| 4,286,985 A | 9/1981 | Van Linden et al. ............ 75/65 |
| 4,330,264 A * | 5/1982 | Konishi et al. ............... 432/77 |
| RE31,028 E | 9/1982 | Cromwell ..................... 241/14 |
| 4,368,956 A | 1/1983 | Yamada et al. ............. 350/432 |
| 4,394,978 A | 7/1983 | Weiss ......................... 241/23 |
| 4,437,605 A * | 3/1984 | Tucker et al. .............. 228/180.1 |
| 4,540,163 A | 9/1985 | Van Linden et al. ........ 266/201 |
| 4,604,136 A * | 8/1986 | Bergkvist et al. ........... 264/237 |
| 4,632,291 A | 12/1986 | Rahn et al. ..................... 228/9 |
| 4,656,572 A | 4/1987 | Caputo et al. ................ 363/41 |
| 4,705,466 A * | 11/1987 | Balassa ......................... 425/6 |
| 4,772,320 A | 9/1988 | Van Linden et al. ........ 75/68 R |
| 4,802,617 A | 2/1989 | Deambrosio ............. 228/180.1 |
| 5,361,969 A | 11/1994 | Gileta ...................... 228/180.1 |
| 5,601,631 A * | 2/1997 | Rinker et al. .................. 75/484 |
| 6,284,190 B1 | 9/2001 | van der Lugt et al. ..... 266/227 |
| 2002/0005376 A1 | 1/2002 | Tooyama et al. |

FOREIGN PATENT DOCUMENTS

| FR | 2 404 468 | 4/1979 |
| JP | 63 080962 | 4/1988 |
| JP | 03 243731 | 10/1991 |
| JP | 08 092710 | 4/1996 |
| WO | WO 82/01895 | 6/1982 |
| WO | WO 84/03719 | 9/1984 |
| WO | WO 95/25823 | 9/1995 |
| WO | WO 00/02695 | 1/2000 |
| WO | WO 00/06781 | 2/2000 |
| WO | WO 02/062515 | 8/2002 |

OTHER PUBLICATIONS

International Search Report for PCT/US 03/01562, mailed May 21, 2003.

* cited by examiner

Primary Examiner—Tom Dunn
Assistant Examiner—Jonathan J Johnson
(74) Attorney, Agent, or Firm—Mintz, Levin, Cohn, Ferris, Glovsky, and Popeo, P.C.

(57) ABSTRACT

The invention provides an apparatus that separates solder from solder dross, comprising first and second rolls and a fixture. The first roll has a substantially cylindrical surface and is rotatable about a first longitudinal axis. The second roll has a substantially cylindrical surface and is rotatable about a second longitudinal axis parallel to the first longitudinal axis. The fixture is coupled to the first and second rolls and spaces the second roll apart from the first roll by a first distance, such as 0.001 to 0.015 inches, the first distance sufficient to separate a solder-dross mixture directed between the first roll and the second roll into a liquid solder and a dross powder when the first and second rolls are rotated in opposite directions.

29 Claims, 6 Drawing Sheets

SOLDER-DROSS MIXTURE SEPARATION METHOD AND APPARATUS

FIELD OF THE INVENTION

Embodiments of the invention generally relate to devices, systems, and methods for recovering metallic substances such as solder from secondary sources such as dross. More particularly, the invention relates to systems, devices, and methods for recovering solder from dross during wave soldering processes.

BACKGROUND OF THE INVENTION

When many molten metals are in contact with the air, compounds of those metals, primarily oxides, but also nitrides and other non-metallic impurities, can be formed. When the molten metal is moving, the metal and the metal oxide combine to form a material known as dross. Dross consists of droplets of the molten metal that are encrusted with the oxide to form a sponge-like network. The dross of lead-tin solder, for example, can have a lumpy, granular appearance. The dross floats, because of surface tension and/or buoyancy, on the molten metal or sticks to the container holding the metal. Various methods have been used to attempt to prevent formation of dross, such as by preventing air from contacting the solder by pouring a layer of oil on the solder. The use of oil can be messy, however, and may degrade the solder.

Many methods of soldering, such as in wave soldering, can cause dross (also referred to as a solder-dross mixture) to be formed. For example, in a wave soldering machine, solder in a bath is pumped to create a static wave in the surface of the solder, and printed circuit boards are fed across the crest of the wave so that the solder "kisses" the leads of the components and the tracks of the circuit board. If dross is allowed to build up, it can become entrained in the wave and adversely affect the quality of the soldering, causing low product yields. In addition, the dross can self skim from the wave to collect on the surface of the solder pot in the wave-soldering machine. When dross recirculates through the solder pump, it can appear as undesirable matter in the wave. In addition, leaving dross in the solder pot can create problems for soldering quality and solder pot life.

Frequent removal of dross can be necessary for proper use of the solder, especially in wave soldering machines. One removal method used in wave-soldering machines involves skimming the dross or in some other way removing the dross from the surface to avoid recirculation of dross. One method of removing dross from the solder is by ladling off the dross (which floats). A large percentage (e.g., 30–90%) of the solder, however, can be lost with the dross. Further, disposing of the raw dross and replacing it with "clean" metal can be expensive.

It is estimated that dross can consist of 30–90% good solder capable of being reclaimed. One method of reclaiming solder from dross is heating the dross that has been skimmed/ladled off. However, this method can be inefficient and uneconomical. Because dross consists of pockets of good solder that are surrounded by a crust-like envelope of tin and lead oxides, some solder reclamation methods attempt to compress the dross, sometimes while heating the dross, until the oxide bursts and the liquid solder can escape.

One dross compression technique involves using a pair of rollers disposed in parallel, and rotated in opposing directions to form a "bite" on dross directed therebetween. The dross is fed between the rollers, and liquid solder and sheets of dross are produced at the other side of the rollers. This dross compression technique does not always efficiently separate liquid solder from the dross sheets, and the resultant liquid solder and/or dross sheets can be impure. In addition, the sheets of dross can be awkward to handle and can require frequent maintenance to remove. Further, the sheets of dross may still contain usable solder. To help divide the sheets into a more manageable size and guide the liquid solder away from the dross, the rollers may be ribbed, grooved, or perforated.

SUMMARY OF THE INVENTION

The inventor of the present invention has found that flowing a solder-dross mixture along rollers having channels, indents, holes, and other non-smooth surfaces can create additional dross in the solder-dross mixture at the location of the hole, indent, etc. The inventor of the present invention has further found that methods of reclaiming solder that use devices (e.g., knife-like devices, augers, and the like) to cut through dross floating on the surface of the solder (such as solder in solder pots) also can create even more dross in the solder-dross mixture. The inventor of the present invention has further determined that providing at least one roll with a smooth surface can decrease the dross created in the solder-dross mixture passed between a pair of rolls, which may help to increase the solder reclaimed from the solder-dross mixture.

In addition, the inventor of the present invention has found that, when compressing dross through a pair of rolls, the rolls can be spaced so that the compressions produces dross powder and liquid metal, instead of a sheet of dross. The inventor of the present invention has further discovered that heating at least one of the pair of rolls can help the solder-dross mixture separate into liquid solder and dross powder, with dross powder tending to cling to the heated roll because of the heat of the roll and/or the inherent surface tension of the dross powder. This dross powder drawn to the heated roll can then be removed from the roll, such as by scraping or by a vacuum, enabling the remaining liquid solder to be re-used.

In one embodiment, the invention includes an apparatus that separates solder from solder dross, comprising first and second rolls and a fixture. The first roll has a substantially cylindrical surface and is rotatable about a first longitudinal axis. The second roll has a substantially cylindrical surface and is rotatable about a second longitudinal axis parallel to the first longitudinal axis. The fixture is coupled to the first and second rolls and spaces the second roll apart from the first roll by a first distance, such as 0.001 to 0.015 inches, the first distance sufficient to separate a solder-dross mixture directed between the first roll and the second roll into a liquid solder and a dross powder when the first and second rolls are rotated in opposite directions.

The first roll can be constructed and arranged to operate at a temperature sufficient to cause the dross powder to be drawn toward the surface of the first roll, and the second roll can be constructed and arranged to operate at a second temperature that is lower than the first temperature. The surface of the first and second rolls can be substantially smooth (e.g., no rougher than 128 $\mu$in. RMS). The fixture can be constructed and arranged to hold the first and second rolls in an alignment such that the first and second longitudinal axes are parallel and lie in a common plane that is positioned no more than forty-five (45) degrees from horizontal.

In one embodiment, the apparatus further comprises a dross remover, such as a scraper, constructed and arranged to remove dross powder from the first roll. In one embodiment, the apparatus further comprises a container constructed and arranged to receive the liquid metal and dross powder. The container can maintain the liquid metal received therein in a liquid form and can be constructed and arranged to permit the liquid metal received therein to be directed into a first receptacle and the dross powder received therein to be directed into a second receptacle. The container can, for example, be the solder pot of a wave-soldering machine.

In one embodiment, the invention provides a system that separates solder from a solder-dross mixture contained in a first container, such as the solder pot of a wave soldering machine. The system comprises a dross mover and a solder separation apparatus. The dross mover, such as a conveyor, transports the solder-dross mixture from the wave-soldering machine to a solder separation apparatus, which comprises first and second rolls and a fixture. The first roll is constructed and arranged to be controlled a first temperature and has a substantially cylindrical surface and is about a first longitudinal axis. The second roll has a substantially cylindrical surface and is rotatable in a second direction about a second longitudinal axis parallel to the first longitudinal axis. The fixture is coupled to the first and second rolls and spaces the second roll apart from the first roll by a first distance, the first distance sufficient to separate a solder-dross mixture directed between the first roll and the second roll, when the first and second rolls are rotated in opposite directions, into a liquid solder and a dross powder when the first and second rolls are rotated in opposite directions.

In another embodiment, the invention provides, for a fixture having first and second parallel cylindrical rolls spaced apart by a fixed distance, a method for separating metal from a solder-dross mixture. A flow of a metal-dross mixture is delivered between the first and second parallel cylindrical rolls. The first and second rolls are rotated in opposite directions to draw the metal-dross mixture between them. The rotation of the first and second rolls applies a pressure to the solder-dross mixture that is sufficient to separate the solder-dross mixture into a liquid solder and a dross powder. The first roll can be heated to a temperature that causes the dross powder to be drawn to the surface of the first roll. At least a portion of the dross powder on the surface of the first roll can be removed.

In another embodiment, the invention provides an apparatus for separating metal from metal dross, comprising an input for receiving metal dross in a non-solid form and means coupled to the input for separating the metal dross into liquid metal and dross powder. This embodiment can further comprise means for removing the dross powder, and means for directing the liquid metal to a location where the liquid metal can be collected independent of the dross powder Details relating to this and other embodiments of the invention are described more fully herein.

BRIEF DESCRIPTION OF THE FIGURES

The advantages and aspects of the present invention will be more fully understood in conjunction with the following detailed description and accompanying drawings, wherein.

The drawings are not necessarily to scale, emphasis instead generally being placed upon illustrating the principles of the invention.

DETAILED DESCRIPTION

The invention provides, in one embodiment, a solder-dross mixture separation apparatus capable of separating solder from dross in a continuous flow process. The apparatus, system, and process described herein can also be implemented as part of a wave soldering system, where the solder reclaimed from the solder-dross mixture can be returned back to the solder pot of the wave soldering system. The systems, methods, and apparatuses described herein have achieved, in some embodiments, solder recovery rates of 80–90%.

Figure 1:
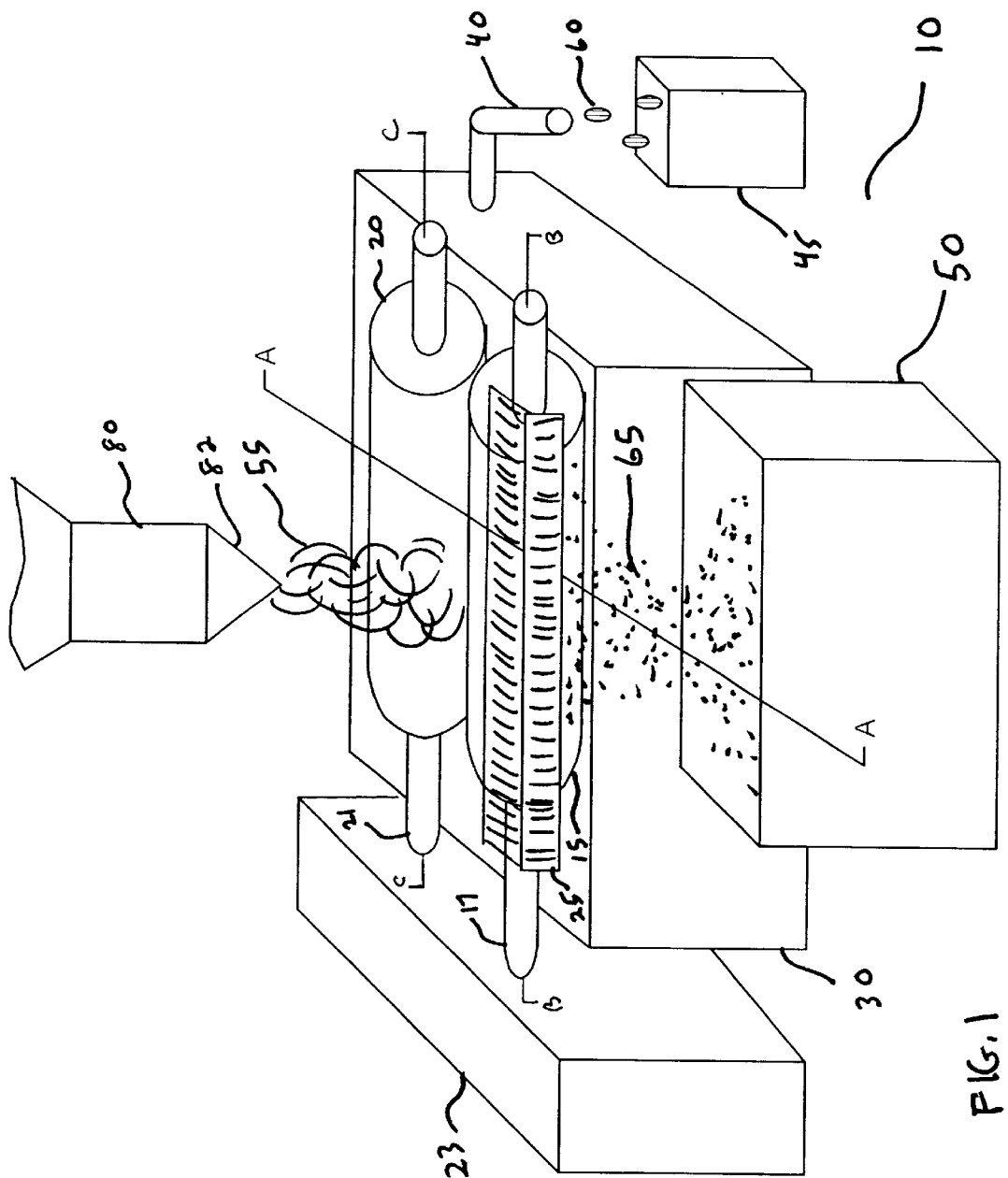
FIG. 1 is a perspective view of a solder-dross mixture separation device, in accordance with an embodiment of the invention.
Figure 2:
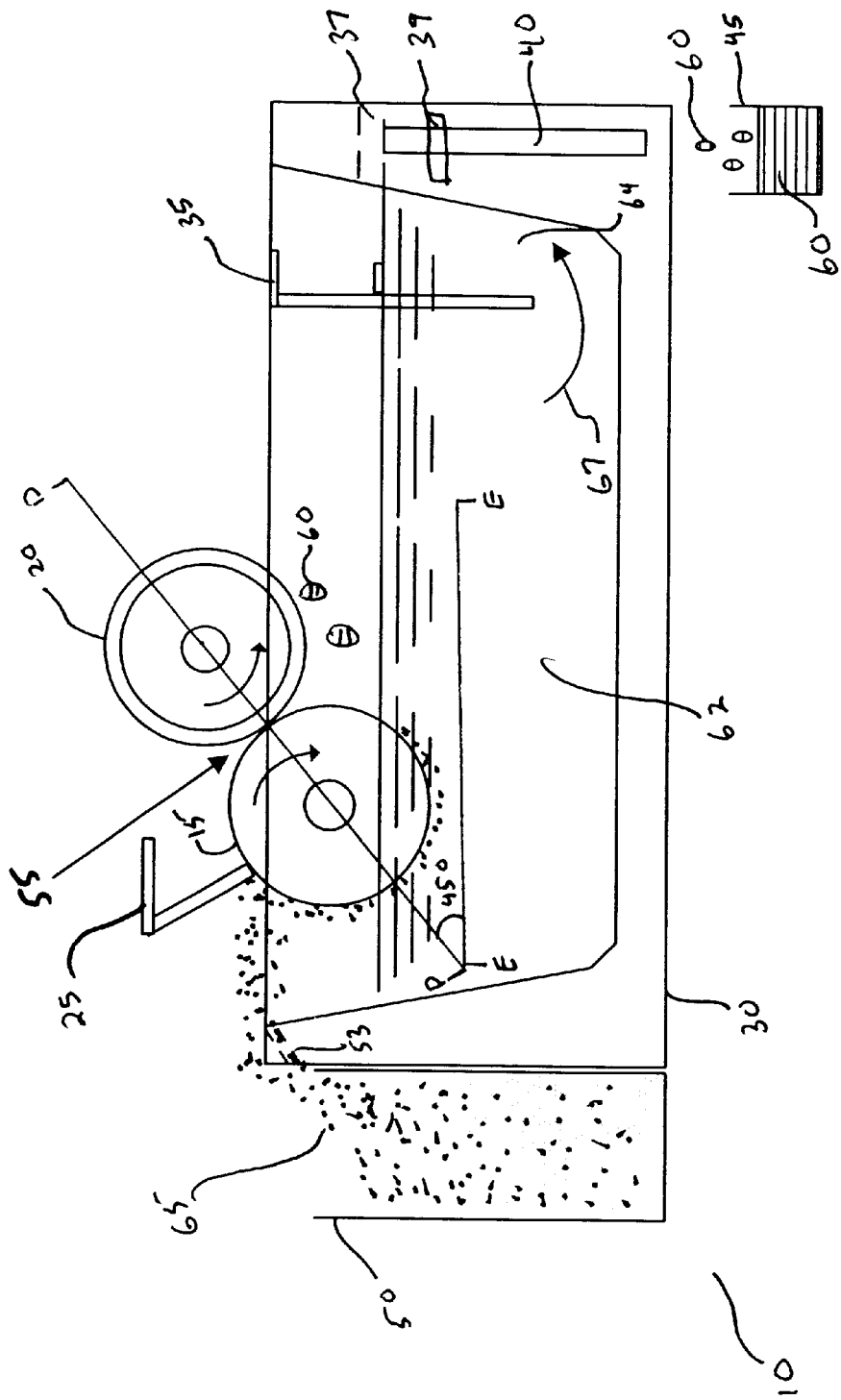
FIG. 2 is a cross-sectional view of the solder-dross mixture separation device of FIG. 1, taken along the A—A line, in accordance with an embodiment of the invention.

FIG. 1 is a perspective view of a solder-dross mixture separation apparatus 10, in accordance with an embodiment of the invention, and FIG. 2 is a cross-sectional view of the solder-dross mixture separation apparatus 10 of FIG. 1, taken along the A—A line. The apparatus 10 comprises a first roll 15, a second roll 20, a fixture 23, holding the first and second rolls 15, 20, a dross remover 25, and a solder container 30 having a divider 35.

The first and second rolls 15, 20, each have a substantially cylindrical shape, and are arranged so that the axis of rotation for the first roll 15 (B—B) is substantially parallel to the axis of rotation for the second roll 20 (C—C). Rotational motors (not shown) drive the first and second rolls 15, 20, along respective axial shafts 17, 21 so that the rolls are counter rotating. In one embodiment, the first roll 15 rotates clockwise and the second roll 20 rotates counterclockwise. In one embodiment, the first and second rolls 15, 20 are smooth compression rolls, with very smooth surfaces. For example, in at least one embodiment, the surfaces of the first and second rolls 15, 20 have a surface with a smoothness comparable to the smoothness of glass. In one embodiment, at least one of the first and second rolls 15, 20 have a finish polished to a level of about of 128 $\mu$in. RMS/RMF or less (e.g., about 4–128 in. RMS (root mean square roughness)). It has been found that using rolls with smooth and/or polished surfaces helps to reduce formation of additional dross during the dross compression process described herein. However, rolls that are not smooth and/or which have compressions, channels, holes, vents, and the like, are usable with the invention, although the resultant compression process may result in less efficient dross/solder separation.

In the apparatus 10 of FIG. 1, the fixture 23 holds the first and second rolls 15, 20 along at least one end of the rolls 15, 20 firmly into position to maintain a fixed clearance between them and a compression along the edges of the rolls 15, 20 that is sufficient for the first and second rolls 15, 20 to create a "bite" on the solder-dross mixture 55 that is directed between the first and second rolls 15, 30. For example, in one embodiment, the fixed clearance between the first roll 15 and the second roll 20 is about 0.001 inches to 0.015 inches. Maintenance of the clearance distance also can be important to prevent the counter-rotating rolls from being so close together so as to produce extruded solder sheets instead of liquid solder 60. Other clearances could be used, however. For example, if the apparatus 10 is being used with some metal-dross mixtures, such as dross from so-called "pig iron", a larger clearance between the first and second rolls 15, 20 may be required.

In the embodiment of the apparatus 10, as illustrated in FIG. 2, the fixture 23 (which, for clarity, is not illustrated in FIG. 2) maintains the first and second rolls 15, 20 in an alignment such that the first and second longitudinal axes are parallel and lie in a common plane (D—D) that is positioned no more than forty-five (45) degrees from horizontal (shown by line E—E). Use of angles of 45-degrees and less can help the first and second rolls 15, 20 "bite" the solder-dross mixture 55 more efficiently. Note that angles of zero (0) degrees from horizontal (e.g., the first roll 15 and second roll 20 are at approximately the same level) are usable in at least one embodiment of the invention, as illustrated in the apparatus 250 of FIG. 6 (discussed more fully herein).

Although not illustrated in FIG. 1, the fixture 23, in one embodiment, can be constructed to connect to the other sides of the first and second rolls 15, 20, instead of or in addition to connecting to the end of the first and second rolls 15, 20, as illustrated in FIG. 1. Those skilled in the art will appreciate that many different designs and arrangements of fixtures 23 are usable to hold the first and second rolls 15, 20 in place.

In one embodiment, the compression force that the first and second rolls 15, 20 put on the solder-dross mixture 55 when the first and second rolls 15, 20 are rotated in opposite directions is about 50–75 pounds per square inch (PSI) along the face of the first and second rolls 15, 20. This can result in a very high resultant compression force applied along the surface of the first and second rolls 15, 20 to a solder dross mixture directed between the first and second rolls 15, 20. In one embodiment, the resultant compression force is about 84,750 PSI. The first and second rolls 15, 20 are rotated, in one embodiment, at a speed less than or equal to twenty (20) rotations per minute (RPM). In one embodiment, as the diameter of the first and second rolls 15, 20 increases, the rotation speed used may decrease. Slower rotation speeds may provide more time for the solder "embedded" in the solder-dross mixture to be squeezed out and to drop away from the first and second rolls 15, 20.

The first roll 15 is termed a "hot" roll, because the first roll 15 is heated, such as by being partially submerged (in one embodiment, the first roll 15 is at least 40% submerged) in liquid solder contained in the solder container 30. In one embodiment (as explained herein), the solder container 30 may be pre-filled with solder and brought to an operating temperature, so that the solder is substantially liquefied. Note that the first roll 15 also can be heated by another technique, such as by disposing a heating element (not shown) within the first roll 15, along the surface of the first roll 15, or close enough to the first roll 15 to bring the first roll to an appropriate temperature. The temperature of the first roll 15 when heated to operating temperature, can range from 375–575 degrees Fahrenheit (for example, if the temperature of liquid solder contained in the solder container 30 is about 375–575 degrees Fahrenheit, the first roll 15 in contact with this liquid solder can be brought to about the same temperature as that of the liquid solder). The operating temperature may depend on the type of metal being recovered. For example, for recovery of lead-based solder, the operating temperature is, in one embodiment, about 450 to 500 degrees Fahrenheit. In another example, for some types of non-lead solder, the operating temperature of the first roll 15 can be about 575 degreed Fahrenheit.

The second roll 20 is termed a "cold" roll because the second roll 20 is at a temperature lower than that of the first roll 15. This temperature difference between the first and second rolls 15, 20 can help the solder-dross mixture 55 more efficiently separate into liquid solder 60 and dross powder 65, as explained further below. In addition, the inherent surface tensions of the liquid solder 60 and the dross powder 65 help the separation process, as explained herein.

The first and second rolls 15, 20 can be made out of any material that is hard enough to maintaining the required pressure on the solder-dross material flowing between the rolls 15, 20 when the rolls 15, 20 are rotated in opposite directions. The first roll 15 can be made out of any material that is capable of withstanding the operational temperatures to which the first roll 15 may be brought (e.g., up to five hundred seventy five (575) degrees Fahrenheit, depending on the type of solder used and/or metal being recovered.) An example of a usable material for the first and second rolls 15, 20, according to one embodiment, is a metal such as steel.

The solder container 30 is a container capable of receiving the liquid solder 60 and maintaining the liquid solder 60 in a liquid form. For example, the solder container 30 can be a solder pot (e.g., a so-called "mini-pot"). The solder container 30, in one embodiment, is further constructed and arranged to be pre-filled with a quantity of solder, which can be brought to an appropriate operating temperature (e.g., so that the solder is liquid) to help facilitate the separation process (as explained below). In one embodiment, the solder container 30 includes a divider 35 that divides the solder pot into at least two compartments, shown in FIG. 2 as a first chamber 62 and a second chamber 64. Each chamber 62, 64 is an opening or cavity defined within the solder container 30. The first chamber 62 is disposed so that it receives the output produced when the first and second rolls 15, 20 are counter-rotated (i.e., the liquid solder 60 and the dross powder 65).

The divider 35 can be any structure (or set of structures) permitting flow over it or under it, such as a weir (also referred to as a weir plate). The divider 35 can, for example, be part of the structure of the solder container 30. The divider 35 of the of the apparatus of FIG. 2 is oriented in the solder container 30 so that dross floating on the surface of the first chamber 62 is prevented from reaching the second chamber 64, while the second chamber 64 is able to receive liquid solder 60 that flows either under the divider 35 (e.g., via passage 37) or through some other opening provided on the divider 35. The divider 35 helps to prevent any dross powder 65 floating on top of the liquid solder 60 from getting into the second chamber 64 (note that dross powder 65 floats on top of liquid solder 60). The divider 35 is, in one embodiment, a weir plate. In one embodiment, the divider 35 is disposed far enough away from where the first and second rolls 15, 20 output to the solder container 30, such that dross powder 65 does not tend to contact and/or build up on the divider 35.

In at least one embodiment, however, the solder container 30 does not require a divider 35. For example, in the embodiment of FIG. 3, the solder container 30 is constructed so that the liquid solder 60 can drain into a passage 39 that directs the liquid solder 60, via a substantially hollow member 42, to a vessel 46 capable of receiving the liquid solder. As those skilled in fluid statics and dynamics will understand, the size, depth, and pressure of the vessel 46, and the substantially hollow member 42 can be selected so that the liquid solder 60 will flow from the solder container 30 to the vessel 46. As with the solder mold 45 of FIGS. 1 and 2, sensors (not shown) and other detection mechanisms can be used to determine when the vessel 46 needs to be emptied.

The solder container 30 can, in one embodiment, include a trough 53 to permit the dross powder 65 removed from the first roll 15 (and/or any dross powder 65 floating on top of the solder 60 and adjacent to the first roll 15) to be delivered to a dross receptacle 50. In at least one embodiment, the solder container 30 is constructed to permit the dross powder 65 to "overflow" over the edge of the solder container 30, into the dross receptacle 50.

In one embodiment, the solder container 30 is constructed and arranged to permit the liquid solder 60 in the second chamber 64 to flow out of the solder container 30, to be reused. As described above, in FIG. 3, the liquid solder 60 received in the vessel 46 can be reused. In another embodiment, the solder container includes an overflow plate 37 (which, in one embodiment, is a weir plate) that is constructed and arranged to permit the liquid solder 60 to drain from the second chamber 64 of the solder container 30 into a solder mold 45. In one example, the solder container 30 is constructed so that the liquid solder 60 can overflow over the edge of the container into the solder mold 45. In one embodiment, the solder container 30 further includes a cut-off valve 39 that is responsive to the amount of liquid solder 60 in the mold and prevents liquid solder 60 from draining into the solder mold 45 if the solder mold 45 is full. In one embodiment, the solder mold 45 has a sensor (not shown) to detect the "full" condition and/or to communicate information (e.g., to a user, operator, or another entity, such as a computer) necessary to close the cut-off valve 39. As those skilled in the art will appreciate, this shut-off process may be automated and/or performed manually.

Referring again to FIGS. 1, 2, and 3, the apparatus 10 further comprises a dross remover 25. The dross remover 25 removes the dross powder 65 from the first roll 15, so that the dross powder 65 can be disposed of and/or collected, such as by collecting into the dross receptacle 50. The dross remover 25 in one embodiment is a scraper oriented to scrape dross powder 65 off of the first roll 15, so that the dross powder 65 can be received in the receptacle 50. The scraper can have any configuration and/or surface capable of scraping the dross powder 65 of the first roll 15. In one embodiment, the scraper is made of a substantially stiff material, such as metal or plastic, that is capable of scraping dross powder off of the first roll 15. The scraper can have a smooth surface, a serrated surface, a combination of smooth and serrated surface, a series of "teeth", etc.

Note that it is not required that the dross remover 25 remove the dross powder 65 from the first roll 15 such that the dross powder 65 can be collected in the receptacle 50. Dross removers that remove the dross powder 65 from the first roll 15 and get the dross powder 65 to some other place also are usable in embodiments of the invention. For example, in one embodiment, the dross remover 25 is a device, such as a vacuum, capable of pulling and/or "sucking" the dross powder 65 (and/or other particles) off the first roll 15. Any device capable of removing the dross powder 65 from the first roll 15 is usable as a dross remover in accordance with the invention, including devices such as those having a series of teeth to "grab" the dross powder 65 off the first roll 15, devices that provide a surface to which the dross powder 65 can adhere (e.g., another roll or a conveyor having a "sticky" surface that is positioned sufficiently close to the first roll 15 to capture dross powder 65 on or near the surface of the first roll 15), devices capable of "washing away" the dross powder 65 with a gas and/or a liquid, and devices capable of "burning" the dross powder 65 off the surface of the first roll 15 (e.g., a laser).

Figure 4:
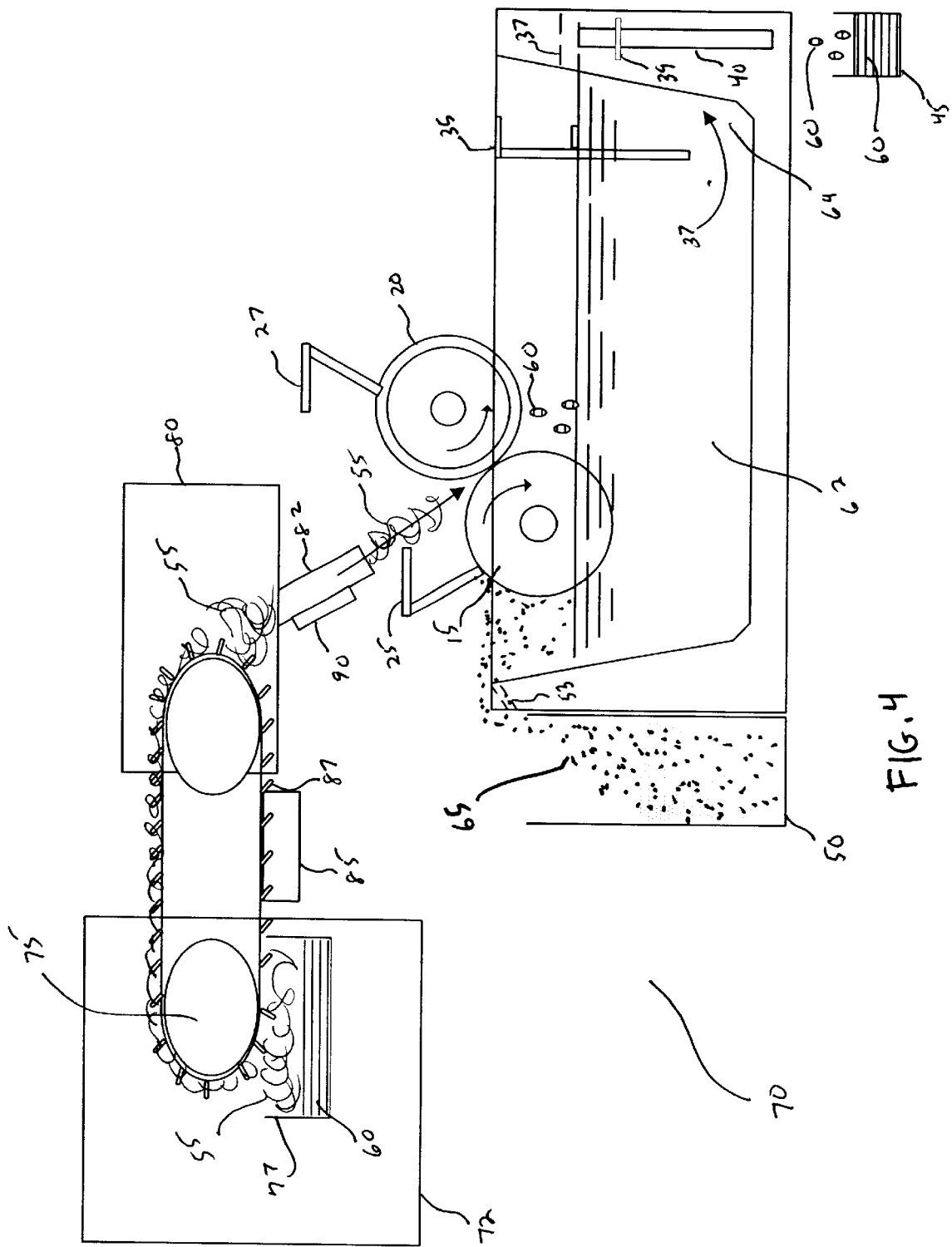
FIG. 4 is a cross-sectional view of a solder-dross mixture separation system, in accordance with an embodiment of the invention.

In one embodiment, the apparatus 10 may include a solder remover 27, which is illustrated in FIG. 4. In some instances, the liquid solder 60 may solidify and/or "cling" to the second roll 20 in a "wetted" form, and the solder remover 27 can be used to remove the solder from the surface of the second roll 20. In one embodiment, the removed solder 60 falls and/or is drawn into the first chamber 62 of the solder container 30. The solder remover 27 can be any device capable of removing solder 60 from the second roll 20. For example, at least some of the devices and/or mechanisms used for the dross remover 25 can be used for the solder remover 27.

The solder-dross mixture separation apparatus 10 can be used with a hot or cold solder-dross mixture, and the solder-dross mixture 55 can be fed between the first roll 15 and the second roll 20 in many ways, including using a mechanical delivery mechanism (an example of which is described herein in connection with FIG. 4) or by hand (e.g., via a ladle). The apparatus 10 can, for example, include a hopper 80 (FIG. 1) to receive the solder-dross mixture 55 and direct it between the rolls 15, 20. FIG. 4 is a cross-sectional view of a solder-dross mixture separation system 70, in accordance with an embodiment of the invention. FIG. 4 illustrates use of a mechanical delivery mechanism and also illustrates the use of an embodiment of the invention with a wave-soldering machine 72. Operation of the wave-soldering machine 72 (which is illustrated in greatly simplified form in FIG. 4) is not discussed here, as such machines are well known in the art. Examples of wave soldering machines usable with the invention include the Electrovert VECTRA wave soldering machine and/or the Electrovert ELECTRA wave-soldering machine, which are available from Electrovert USA in Camdenton, Mo.

Referring to FIG. 4, the system 70 includes the solder-dross mixture separation apparatus 10 of FIGS. 1–2, along with a solder-dross mixture conveyor 75. The solder-dross mixture conveyor 75 transports the solder-dross mixture 55 from solder pot 77 of the wave solder machine 72 to the hopper 80. The solder-dross mixture conveyor 75, in one embodiment, includes a plurality of projecting members 87 that catch the solder-dross mixture 55 from the solder pot 77 of the wave-soldering machine 72 and transport it to the hopper 80. In one embodiment, the hopper 80 has a chute 82 that directs the solder-dross mixture 55 to the solder-dross mixture separation apparatus 10. The solder-dross mixture conveyor 75, in one embodiment, includes a conveyor heater 85, to keep the solder-dross mixture 55 from solidifying during the process. The conveyor heater 85, in one embodiment, maintains the solder-dross mixture at a temperature sufficient to keep the solder-dross mixture in at least a semi-liquid form (e.g., around 450 to 500 degrees Fahrenheit). In one embodiment, the hopper 80 includes a hopper heater 90 (which can, for example be positioned near the chute 82) to maintain the solder-dross mixture 55 in a non-solid form.

The operation of the solder-dross removal apparatus 10 (and the solder-dross removal system 70, which operates similarly) is now described in connection with FIG. 5, which is a flow chart of a method for reclaiming solder from a solder-dross mixture. Steps 120 through 220 of FIG. 5 are usable with the solder-dross mixture separation apparatus 10 of FIGS. 1 and 3 and steps 100 and 110 are applicable to the solder-dross mixture separation system 70 of FIG. 4.

Figure 3:
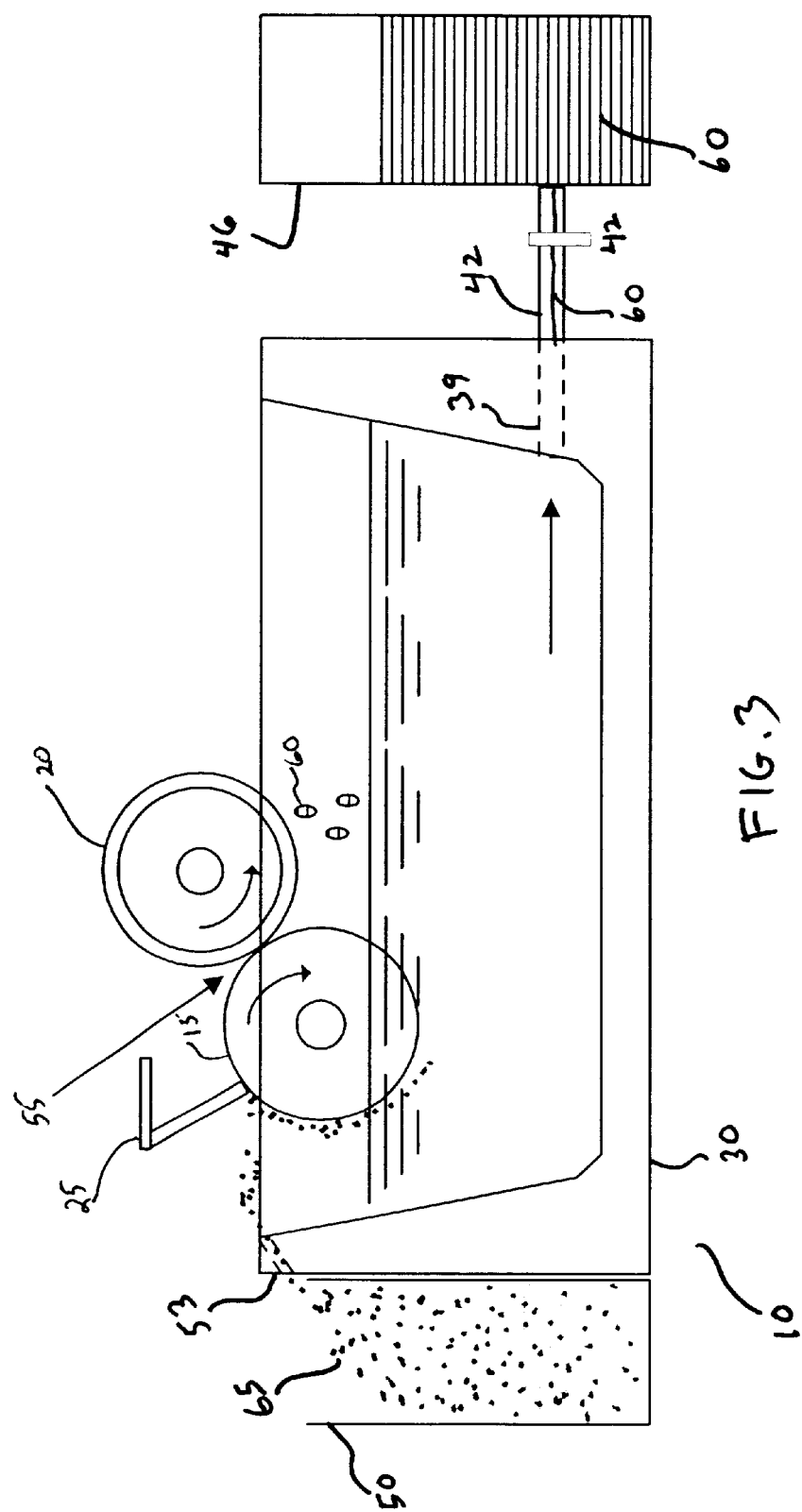
FIG. 3 is a cross-sectional view of a solder-dross mixture separation device, in accordance with an embodiment of the invention.
Figure 5:
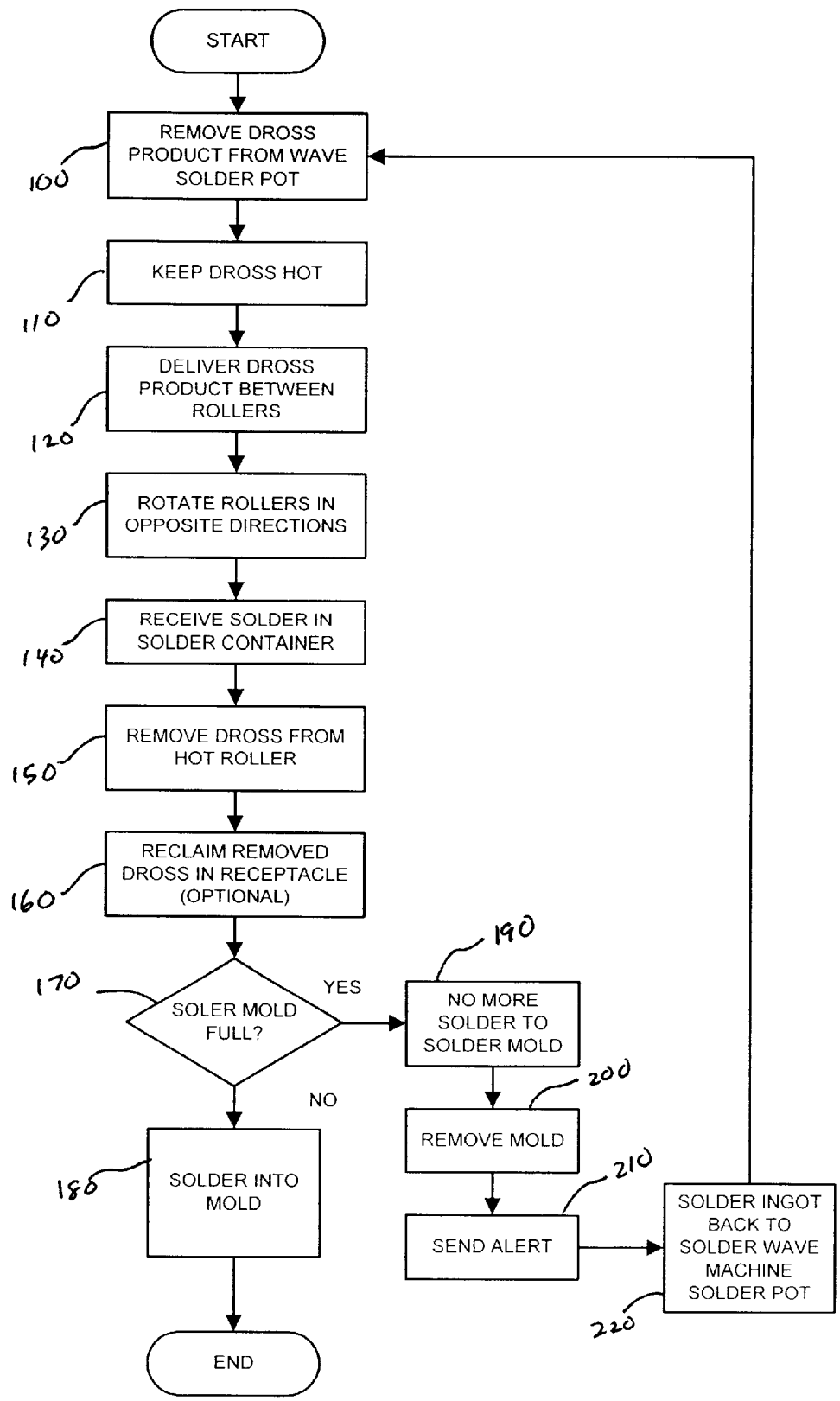
FIG. 5 is a flow chart of a method for reclaiming solder from dross, in accordance with an embodiment of the invention.

For the solder-dross separation apparatus of FIGS. 1–3, the method of FIG. 5 is usable when the solder container 70 has a quantity of liquid solder contained therein, at an appropriate operating temperature (which, in one embodiment, is about 375 to 575 degrees Fahrenheit, depending on the type of solder used) that is sufficient to heat the first roll 15 by contacting the first roll 15. In at least one embodiment of the invention, if the first roll 15 is heated by a mechanism other than contact with the liquid solder in the solder container 30, the quantity of liquid solder in the solder container 30 can vary and need not be of an amount sufficient to contact the first roll 15. For the solder-dross mixture separation system 70 of FIG. 4, the method of FIG. 5 is usable when the connections and arrangements shown in FIG. 4 are substantially complete, the solder pot 77 of the wave soldering machine 72 and the solder container 30 are at least at operating temperature, and when the solder container 30 has a quantity of liquid solder 60 contained therein that is sufficient to heat the first roll 15. Note, as well, that the solder pot 77 and the solder container 30 need not be at the same temperature.

Referring to FIGS. 4 and 5, as the wave-soldering machine 72 operates, the solder-dross mixture 55 is routed to the rear of the solder pot 77. Because the solder-dross mixture 55 is lighter than solder 60, the solder-dross mixture 55 floats to the surface of the solder pot 77. The conveyor 75 removes the solder-dross mixture 55 (step 100) from the solder pot 77 and the solder-dross mixture 55 is kept hot (step 110) while the conveyor 75 transports the solder-dross mixture 55 into the hopper 80, the chute 82 of which deposits the solder-dross mixture 55 between the first and second compression rolls 15, 20 (step 120). Referring to FIGS. 1 through 3, solder-dross mixture is directed, by any appropriate method, between the first and second rolls 15, 20.

In the embodiments shown in FIGS. 1–4, the first roll 15 is at a temperature higher than that of the second roll 20 because the first roll 15 is heated by being in contact with the liquid solder 60 in the solder container 30. This creates a temperature differential between the first and second rolls 15, 20 (the first roll 15 being the "hot" roll and the second roll 20 being the "cold" roll). Referring again to FIGS. 1–5, the first and second rolls 15, 20 are counter-rotated to "bite" the solder-dross mixture 55 (step 130). The compression resulting from this counter-rotation of the first and second rolls 15, 20 causes the solder-dross mixture 55 to be squeezed and/or compressed and broken down into liquid solder 60 (step 140) and dross powder 65. The dross powder 65 can have various textures. In one embodiment, the dross powder 65 has relatively fine particles having a texture substantially similar to that of sugar or flour. In one embodiment, the dross powder 65 is in the form of small flakes having a thickness and size similar to that of flaked cereal, such as corn flakes. These flakes can be four to five times thicker than flaked cereal.

The dross powder 65, regardless of texture or particle size, floats on top of the liquid solder 60 and is picked up by the first roll 15. In addition, the inherent surface tension of the dross powder 65 causes the dross powder 65 to stick to itself (and the first roll 15). Similarly, the inherent surface tension of the liquid solder 60 causes the liquid solder 60 to be drawn towards the liquid solder 60 in the solder container 30. The discharged liquid solder 60 may be in the form of droplets and/or streams of liquid solder 60 and is able to go through any dross powder 65 that may be floating on top of the liquid solder 60 in the container 30. The layer of dross powder 55 is drawn to the first roll 15, from which (via the rotation of the first roll 15) the dross remover 25 can remove it.

The dross remover 25 removes the dross powder 65 from the first roll 15 (step 150). Depending on the type of dross remover 25 that is used, the dross powder 65 may be removed from the system 70 or may be directed into a receptacle 65 (step 160). The liquid solder 60 produced during the counter rotation of the first and second rolls 15, 20 is drained into the first chamber 62 of solder container 30, and then flows into the second chamber 64. The divider 35 helps to prevent dross powder 65 that might be floating on top of the solder from reaching the second chamber 64. In FIGS. 1, 2, and 4, the liquid solder 60 flows into the solder container 30, and under the divider 35 from the first chamber 62 to the second chamber 64, as shown in FIG. 2. In FIG. 3, the liquid solder 60 flows into the solder container 30 and then into the vessel 46.

In one embodiment, if the solder mold 45 is not full (step 170), the liquid solder 60 flows through the passage 37, under the divider 35 to the second chamber 64 and the liquid solder 60 overflows into the solder mold 45 (step 180) (FIGS. 1, 2, and 4). This process can continue until it is detected (e.g., by a sensor) that the solder mold is full (step 170). In one embodiment (FIGS. 2 and 3), the liquid solder 60, after entering the second chamber 64, flows through hollow member 42 into a vessel 46. This process continues until it is detected (e.g., by a sensor) that the vessel 46 is full (step 170).

In one embodiment, when the solder mold 45 and/or the vessel 70 is full (step 170), the cut-off valve 39 (or cut-off valve 44, for the vessel 70 of FIG. 3) prevents more liquid solder 60 from overflowing into the solder mold 45/vessel 46 (step 190). In one embodiment, when the solder mold 45 and/or vessel 46 are full (step 170), a sensor (not shown in FIG. 4) detects the full condition and stops the conveyor 75 from feeding more solder-dross mixture 55 to the rolls 15, 20. When the solder mold 45/vessel 46 is full, the mold 45/vessel 46 can be removed (step 200), so that the solder 60 contained therein can be re-used. In one embodiment, the solder mold 45/vessel 46 can be automatically moved to a different location, for manual or automatic pickup of the solder (e.g., a hardened solder "ingot" contained therein. In one embodiment, an alert is generated (step 210) so that solder mold 45/vessel 46 can be emptied. The liquid solder 60 that is collected in the solder mold 45/vessel 46 can, for example, be returned to the solder pot 77 of the wave solder machine 72 (step 220) to be re-used. The process of FIG. 5 can repeat itself even while wave soldering is occurring in the wave-soldering machine 72.

In one embodiment, when the solder mold 45/vessel 46 is full and being emptied, the first and second rolls 15, 20 are turned off for a short time to allow the molded liquid solder 60 to cool down before being removed from the solder mold 45/vessel 46. The resulting hardened solder 60 can then be removed from the solder mold 45/vessel 46. The rolls 15, 20 are restarted automatically, followed by the conveyor 75.

Figure 6:
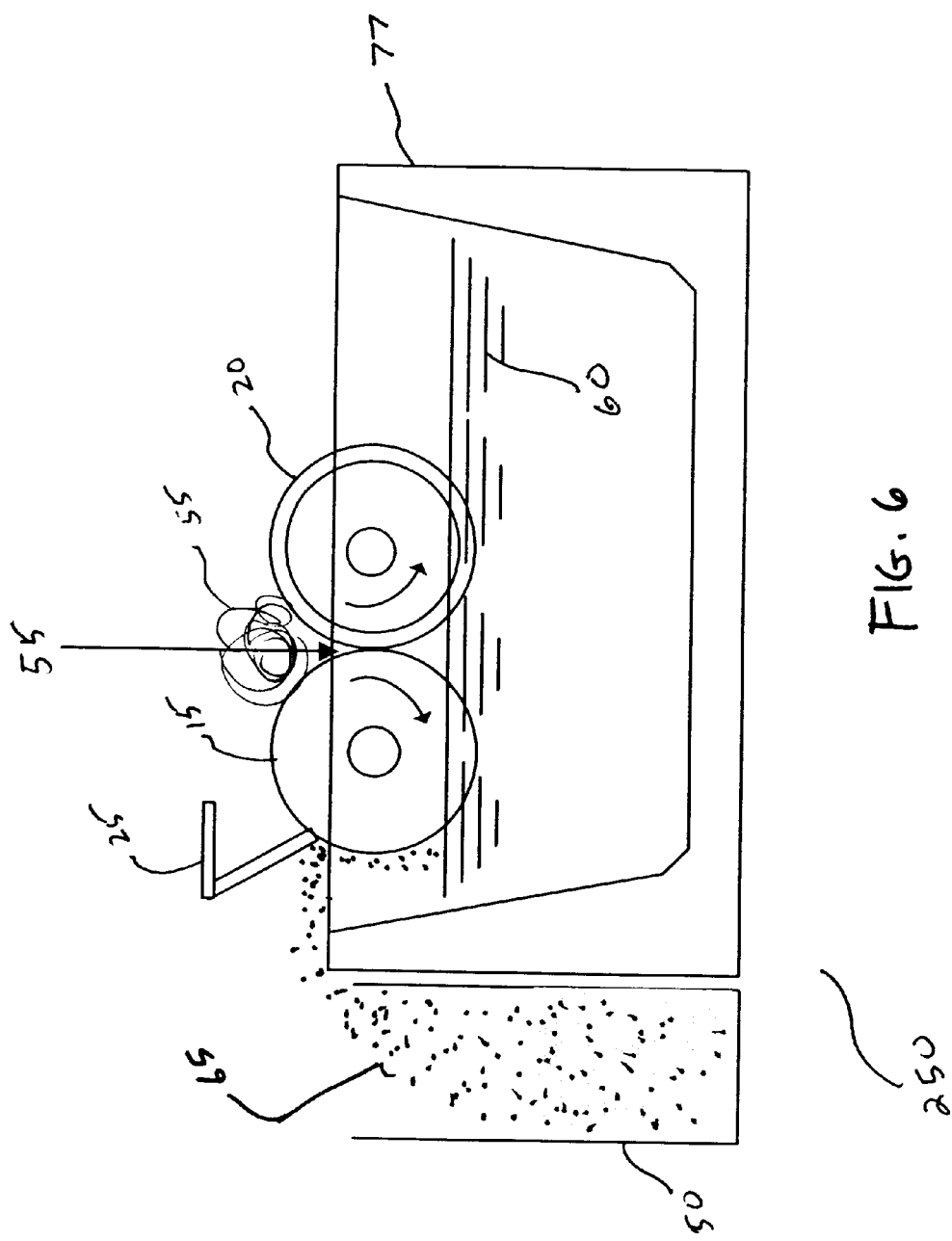
FIG. 6 is a cross-sectional view of a solder-dross mixture separation system used in a wave-soldering machine, in accordance with an embodiment of the invention.

In one embodiment, the solder-dross mixture separation apparatus 10 of FIG. 1 can be adapted to be used directly in the solder pot 77 of the wave solder machine 72 of FIG. 4. FIG. 6 is a cross-sectional view of a solder-dross mixture separation system 250 that can be used in the soldering pot 77 of the wave-soldering machine 72 (FIG. 4), in accordance with an embodiment of the invention. In this system 250, the solder-dross mixture separation occurs directly insider the solder pot 77 of the wave soldering machine 72, and the solder container 30, and solder mold 45 are not necessary. In one embodiment, the apparatus 10 is positioned within the soldering pot 77 so that the rotation of the first roll 15 can draw the floating solder-dross mixture 55 between the first and second rolls 15, 20.

In one embodiment, a conveyor 75 (not shown) may be used to direct the solder-dross mixture 55 between the rolls 15, 20. If the path the conveyor 75 takes is a sufficiently short distance from the solder pot 77 of the wave soldering machine 72, heating the conveyor 75 and/or the chute 82 may not be needed, as the solder-dross mixture will remain at a high enough temperature for the rolls 15, 20 to effectively separate the liquid solder and dross powder. In one embodiment, the first and second rolls 15, 20 can be positioned so that they are able to intake solder-dross mixture 55 directly from the surface of the solder pot 77, producing solder 60 and dross powder 65. The dross powder 65 may be removed from the first roll 15 as described previously in connection with FIGS. 1–5.

Although the apparatuses, methods, and systems disclosed herein are illustrated as recovering solder from solder-dross mixture, those skilled in the art will appreciate that the invention has applicability other types of dross or oxide forming molten metals, as well as virtually any application where a metal is to be recovered from non-metal substance, such as an oxide and/or nitride of the metal.

Variations, modifications, and other implementations of what is described herein can occur to those of ordinary skill in the art without departing from the spirit and the scope of the invention as claimed. Further, many aspects of the embodiments of the invention described herein (including but not limited to the controls and/or sensors described herein) can be implemented using software, hardware, or in a combination of hardware and software.

In describing the embodiments of the invention illustrated in the figures, specific terminology is used for the sake of clarity. However, the invention is not limited to the specific terms so selected, and each specific term at least includes all technical and functional equivalents that operate in a similar manner to accomplish a similar purpose. In addition, it should be understood that, in the figures of this application, in some instances, a plurality of system elements or method steps may be shown as illustrative of a particular system element, and a single system element or method step may be shown as illustrative of a plurality of a particular systems elements or method steps. It should be understood that showing a plurality of a particular element or step is not intended to imply that a system, apparatus, or method implemented in accordance with the invention must comprise more than one of that element or step, nor is it intended by illustrating a single element or step that the invention is limited to embodiments having only a single one of that respective elements or steps. In addition, the total number of elements or steps shown for a particular system element or method is not intended to be limiting; those skilled in the art will recognize that the number of a particular system element or method steps can, in some instances, be selected to accommodate the particular user needs.

Although the invention has been described and pictured in a preferred form with a certain degree of particularity, it is understood that the present disclosure of the preferred form, has been made only by way of example, and that numerous changes in the details of construction and combination and arrangement of parts may be made without departing from the spirit and scope of the invention as hereinafter claimed.

What is claimed is:

1. An apparatus that separates solder from solder dross, comprising:
    a first roll having a substantially cylindrical surface and rotatable about a first longitudinal axis;
    a second roll having a substantially cylindrical surface and rotatable about a second longitudinal axis parallel to the first longitudinal axis; and
    a fixture coupled to the first and second rolls and spacing the second roll apart from the first roll by 0.001 to 0.015 inches.

2. The apparatus of claim 1 wherein the first roll is constructed and arranged to operate at a first temperature sufficient to cause the dross powder to be drawn toward the surface of the first roll.

3. The apparatus of claim 2, wherein the second roll is constructed and arranged to operate at a second temperature that is lower than the first temperature.

4. An apparatus that separates solder from solder dross, comprising:
    a first roll having a substantially cylindrical surface and rotatable about a first longitudinal axis;
    a second roll having a substantially cylindrical surface and rotatable about a second longitudinal axis parallel to the first longitudinal axis; and
    a fixture coupled to the first and second rolls and spacing the second roll apart from the first roll by a first distance, the first distance sufficient to separate a solder-dross mixture directed between the first roll and the second roll into a liquid solder and a dross powder when the first and second rolls are rotated in opposite directions;
    wherein at least one of the first and second rolls has a finish no rougher than 128 $\mu$in.

5. The apparatus of claim 4 wherein the fixture is constructed and arranged to hold the first and second rolls in an alignment such that the first and second longitudinal axes are parallel and lie in a common plane that is positioned no more than forty-five (45) degrees from horizontal.

6. An apparatus that separates solder from solder dross, comprising:
    a first roll having a substantially cylindrical surface and rotatable about a first longitudinal axis;
    a second roll having a substantially cylindrical surface and rotatable about a second longitudinal axis parallel to the first longitudinal axis;
    a fixture coupled to the first and second rolls and spacing the second roll apart from the first roll by a first distance, the first distance sufficient to separate a solder-dross mixture directed between the first roll and the second roll into a liquid solder and a dross powder when the first and second rolls are rotated in opposite directions; and
    a dross remover constructed and arranged to remove dross powder from the first roll.

7. The apparatus of claim 6 wherein the dross remover comprises a scraper that scrapes dross powder from the surface of the first roll.

8. The apparatus of claim 6 further comprising a container constructed and arranged to receive the liquid solder and dross powder.

9. An apparatus that separates solder from solder dross, comprising:
    a first roll having a substantially cylindrical surface and rotatable about a first longitudinal axis;

a second roll having a substantially cylindrical surface and rotatable about a second longitudinal axis parallel to the first longitudinal axis;

a fixture coupled to the first and second rolls and spacing the second roll apart from the first roll by a first distance, the first distance sufficient to separate a solder-dross mixture directed between the first roll and the second roll into a liquid solder and a dross powder when the first and second rolls are rotated in opposite directions; and a solder pot of a wave-soldering machine arranged to receive the liquid solder and dross powder.

10. The apparatus of claim 9 wherein the solder pot is constructed and arranged to permit the liquid solder received therein to be directed into a first receptacle.

11. The apparatus of claim 9 wherein the solder pot is constructed and arranged to permit the dross powder received therein to be directed into a second receptacle.

12. An apparatus that separates solder from solder dross, comprising:

a first roll having a substantially cylindrical surface and rotatable about a first longitudinal axis;

a second roll having a substantially cylindrical surface and rotatable about a second longitudinal axis parallel to the first longitudinal axis;

a fixture coupled to the first and second rolls and spacing the second roll apart from the first roll by a first distance, the first distance sufficient to separate a solder-dross mixture directed between the first roll and the second roll into a liquid solder and a dross powder when the first and second rolls are rotated in opposite directions; and a container constructed and arranged to receive the liquid solder and dross powder and to immerse at least a portion of the first roll in the liquid solder.

13. An apparatus that separates solder from solder dross, comprising:

a first roll having a substantially cylindrical surface and rotatable about a first longitudinal axis;

a second roll having a substantially cylindrical surface and rotatable about a second longitudinal axis parallel to the first longitudinal axis;

a fixture coupled to the first and second rolls and spacing the second roll apart from the first roll by a first distance, the first distance sufficient to separate a solder-dross mixture directed between the first roll and the second roll into a liquid solder and a dross powder when the first and second rolls are rotated in opposite directions; and a container constructed and arranged to receive the liquid solder and dross powder, wherein the container is partitioned into first and second chambers.

14. The apparatus of claim 13 wherein the first chamber is constructed and arranged to receive the liquid solder and the dross powder.

15. The apparatus of claim 14, wherein the container further comprises a passage between the first and second chambers whereby liquid solder received into the first chamber is directed into the second chamber.

16. The apparatus of claim 15 wherein the second chamber is constructed and arranged to permit the liquid solder received therein to be directed to a first receptacle.

17. An apparatus that separates solder from solder dross, comprising:

a first roll having a substantially cylindrical surface and rotatable about a first longitudinal axis;

a second roll having a substantially cylindrical surface and rotatable about a second longitudinal axis parallel to the first longitudinal axis;

a fixture coupled to the first and second rolls and spacing the second roll apart from the first roll by a first distance, the first distance sufficient to separate a solder-dross mixture directed between the first roll and the second roll into a liquid solder and a dross powder when the first and second rolls are rotated in opposite directions; and a solder remover constructed and arranged to remove solder from the first roll.

18. A system that separates solder from a solder-dross mixture contained in a first container, comprising:

a dross mover that transports the solder-dross mixture from the first container to a solder separation apparatus;

a solder separation apparatus receiving the solder-dross mixture from the dross mover, the solder separation apparatus comprising:

a first roll constructed and arranged to be controlled at a first temperature, the first roll having a substantially cylindrical surface and rotatable about a first longitudinal axis;

a second roll having a substantially cylindrical surface and rotatable in a second direction about a second longitudinal axis parallel to the first longitudinal axis;

a fixture coupled to the first and second rolls and spacing the second roll apart from the first roll by a first distance, the first distance sufficient to separate a solder-dross mixture directed between the first roll and the second roll, when the first and second rolls are rotated in opposite directions, into a liquid solder and a dross powder when the first and second rolls are rotated in opposite directions; and a dross remover constructed and arranged to remove dross from the first roll.

19. The system of claim 18 further comprising a second container constructed and arranged to receive the liquid solder and dross powder.

20. The system of claim 19 wherein the fixture is constructed and arranged to permit the first roll to come into contact with dross powder received in the second container.

21. The system of claim 19 wherein the second container is constructed and arranged to maintain solder contained therein in a liquid form.

22. The system of claim 21 wherein the fixture holds the first roll in a position where at least a portion of the surface of the first roll can contact liquid solder received in the second container.

23. The system of claim 22 wherein the first roll is controlled at the first temperature by contact with the liquid solder.

24. A system that separates solder from a solder-dross mixture contained in a first container, comprising:

a dross mover that transports the solder-dross mixture from the first container to a solder separation apparatus;

a solder separation apparatus receiving the solder-dross mixture from the dross mover, the solder separation apparatus comprising:

a first roll constructed and arranged to be controlled at a first temperature, the first roll having a substantially cylindrical surface and rotatable about a first longitudinal axis;

a second roll having a substantially cylindrical surface and rotatable in a second direction about a second longitudinal axis parallel to the first longitudinal axis;

a fixture coupled to the first and second rolls and spacing the second roll apart from the first roll by a first distance, the first distance sufficient to separate a solder-dross mixture directed between the first roll and the second roll, when the first and second rolls are rotated in opposite directions, into a liquid solder and a dross powder when the first and second rolls are rotated in opposite directions; and a heater that maintains the solder-dross mixture in a non-solid form during transport from the first container to the solder separation apparatus.

25. In a fixture having first and second parallel cylindrical rolls spaced apart by a fixed distance, a method for separating solder from a solder-dross mixture, comprising:

delivering a flow of a solder-dross mixture between the first and second parallel cylindrical rolls; and rotating the first and second rolls in opposite directions to draw the metal-dross mixture between them;

whereby the rotation of the first and second rolls applies a pressure to the solder-dross mixture that is sufficient to separate the solder-dross mixture into a liquid solder and a dross powder.

26. The method of claim 25 wherein the fixture spaces the first and second rolls by 0.001 to 0.015 inches.

27. The method of claim 25, further comprising heating the first roll to a temperature that causes the dross powder to be drawn to the surface of the first roll.

28. The method of claim 25, further comprising removing at least a portion of the dross powder on the surface of the first roll.

29. The method of claim 25, wherein delivering a flow of a solder dross mixture further comprises delivering dross from the solder pot of a wave solder machine.

* * * * *